J. G. PHILLIPS.
PACKAGING APPARATUS.
APPLICATION FILED JAN. 21, 1918.
1,330,816.
Patented Feb. 17, 1920.
7 SHEETS—SHEET 1.
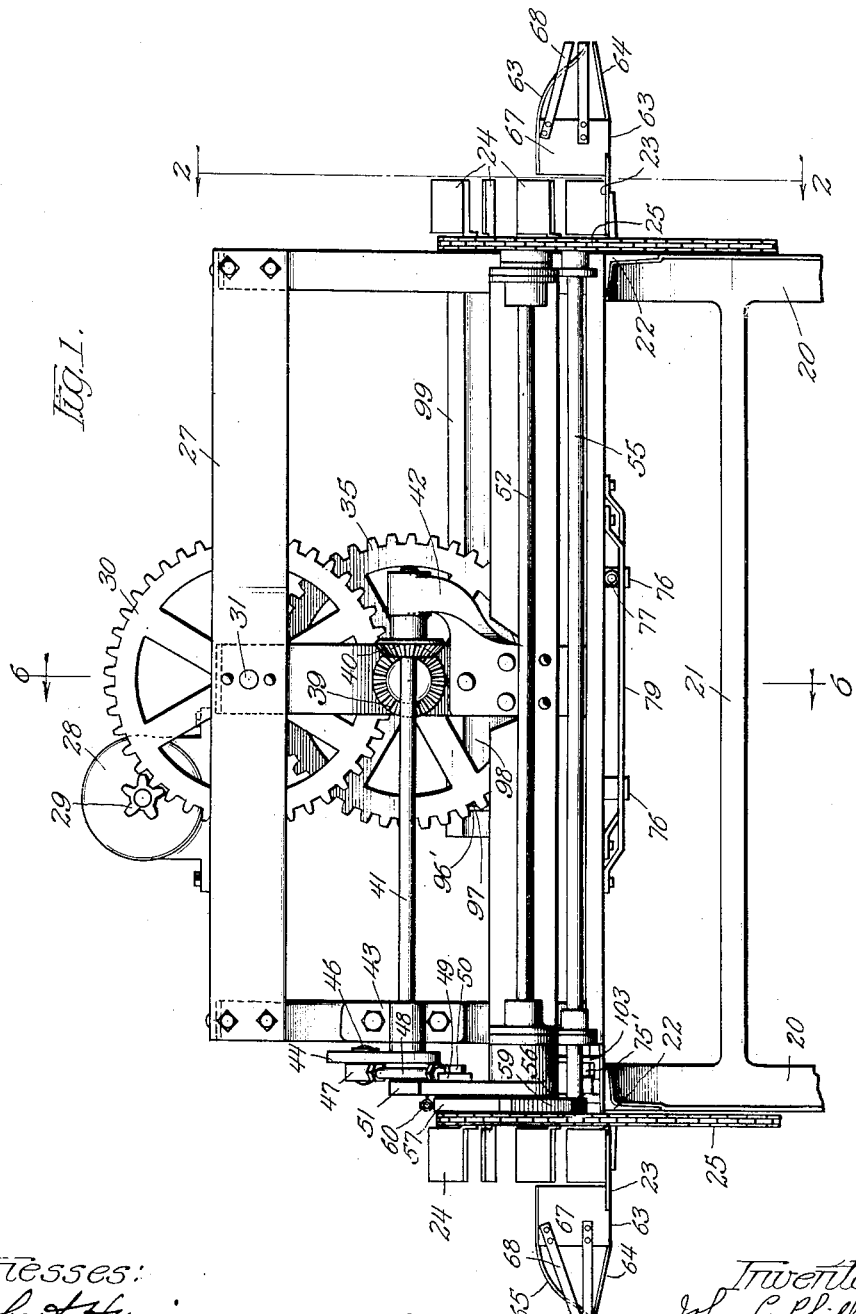

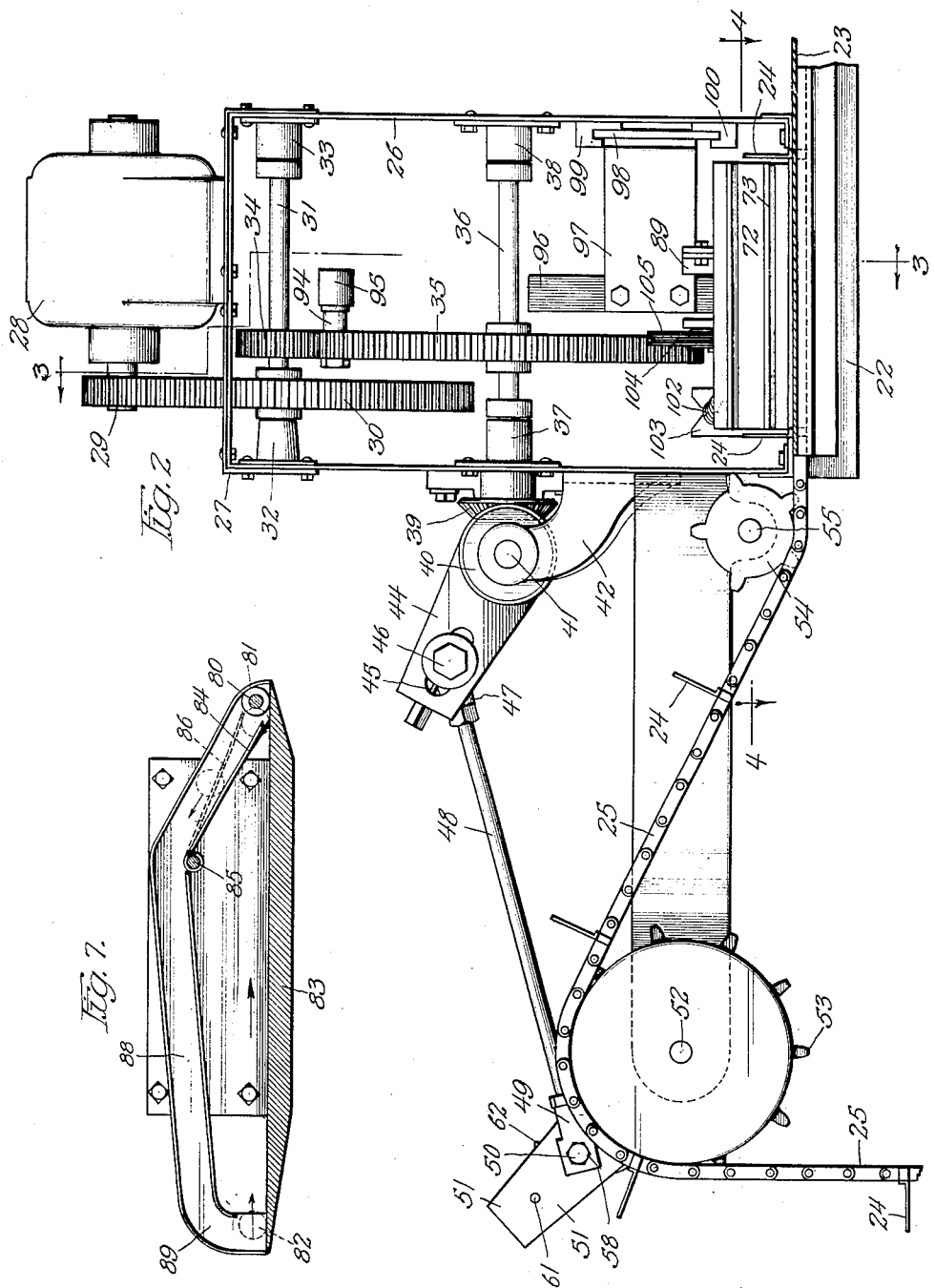

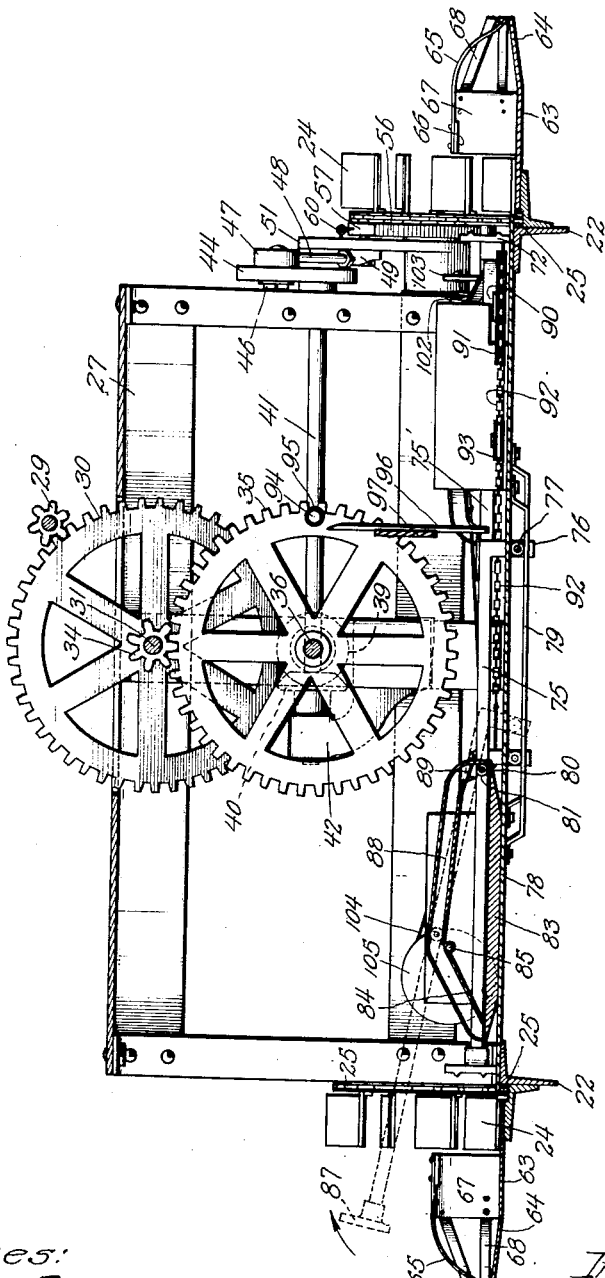

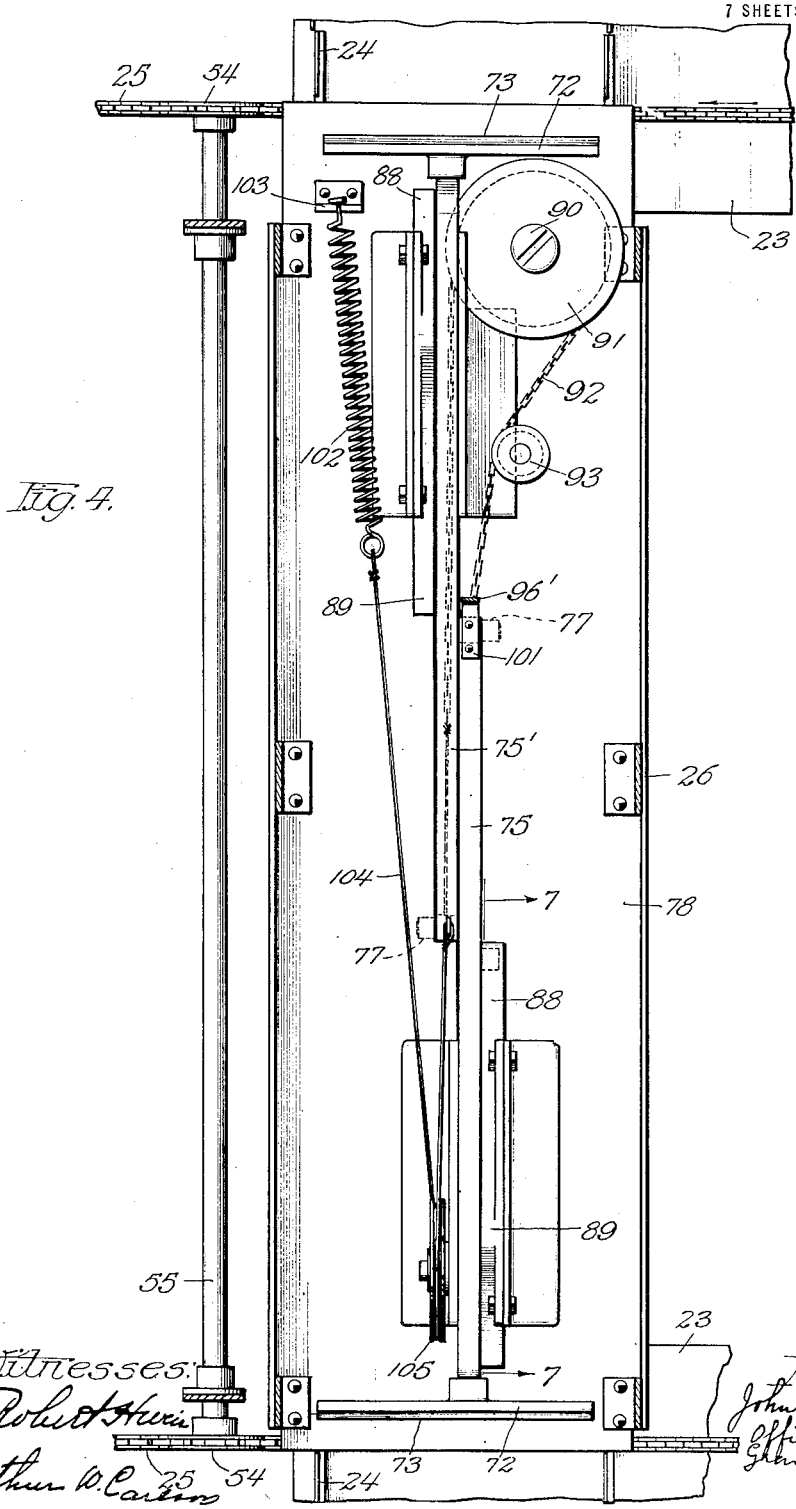

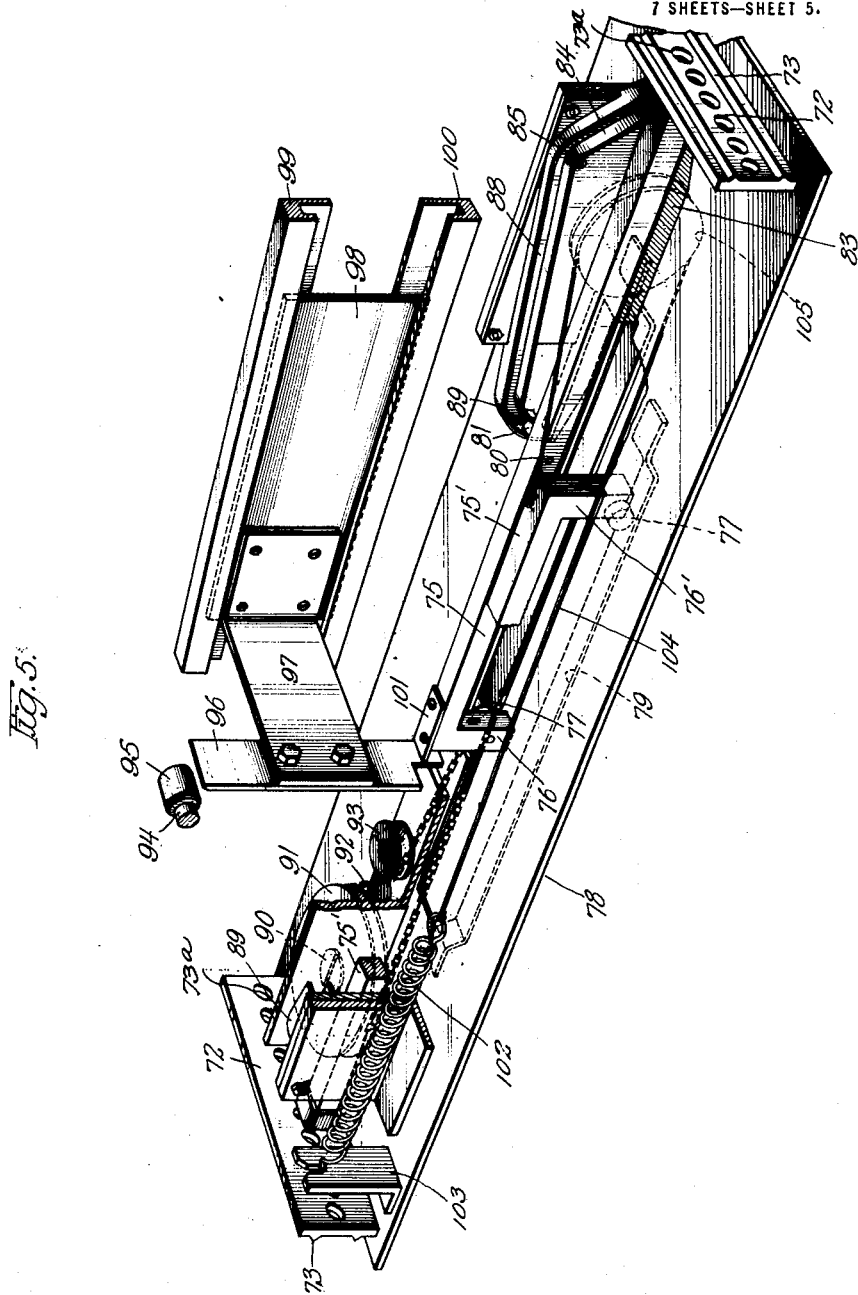

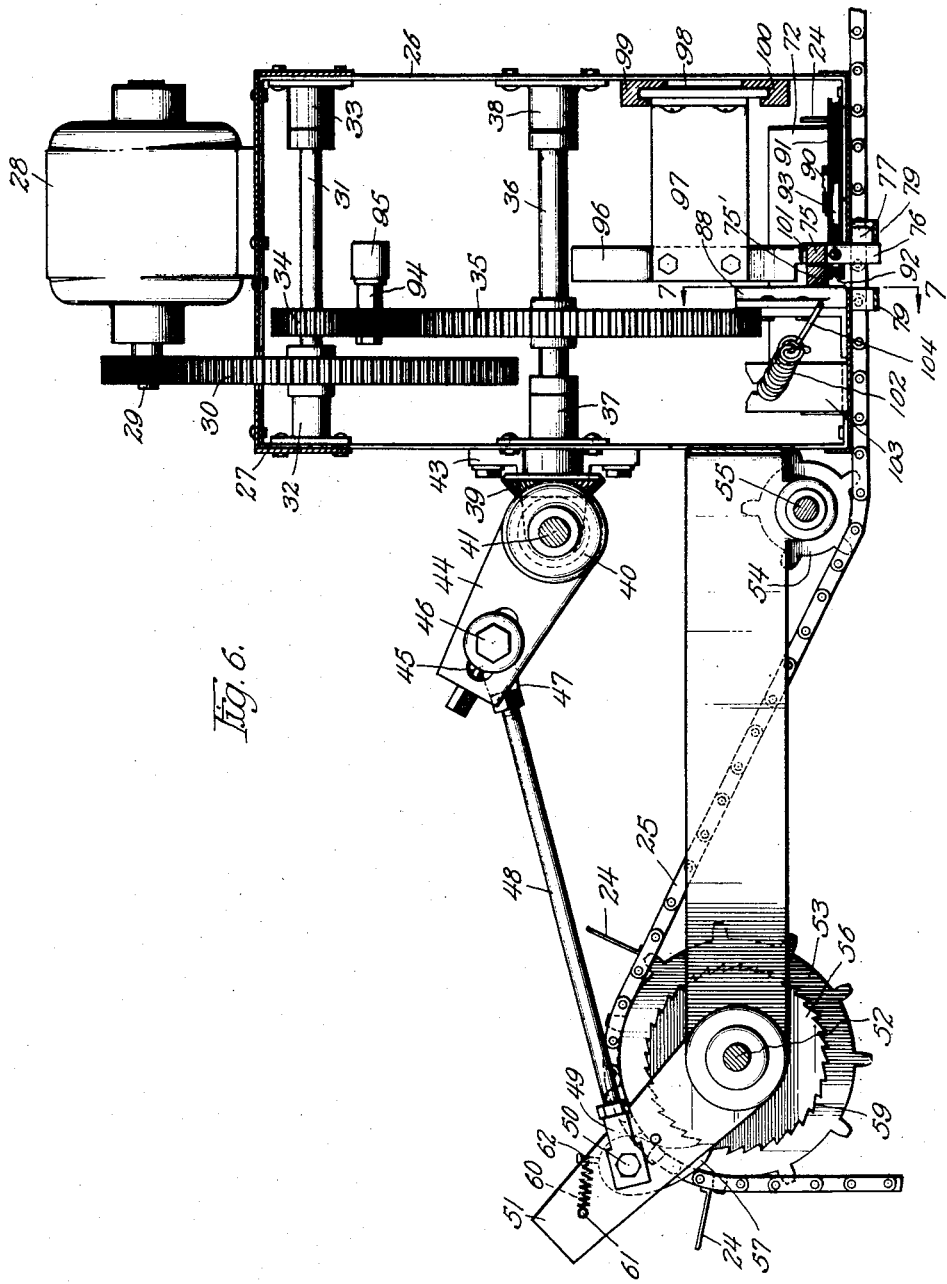

J. G. PHILLIPS.
PACKAGING APPARATUS.
APPLICATION FILED JAN. 21, 1918.

1,330,816.

Patented Feb. 17, 1920.
7 SHEETS—SHEET 7.

Witnesses:
Robert H. Weir
Arthur W. Carlson

Inventor:
John G. Phillips
by Offield Towle Graves & Offield
Attys.

UNITED STATES PATENT OFFICE.

JOHN G. PHILLIPS, OF OMAHA, NEBRASKA, ASSIGNOR TO ITEN BISCUIT CO., OF OMAHA, NEBRASKA, A CORPORATION OF NEBRASKA.

PACKAGING APPARATUS.

1,330,816.  Specification of Letters Patent.  Patented Feb. 17, 1920.

Application filed January 21, 1918. Serial No. 213,054.

*To all whom it may concern:*

Be it known that I, JOHN G. PHILLIPS, a citizen of the United States, residing at Omaha, in the county of Douglas and State of Nebraska, have invented certain new and useful Improvements in Packaging Apparatus, of which the following is a specification.

My invention relates to improvements in packaging apparatus, and has particular reference to a machine for packing bakery goods into receptacles, such as cartons or the like.

The principal objects of the invention are to provide a machine of the class described which shall be capable of handling bakery goods shortly after they have been removed from the ovens and before they have had an opportunity to cool to the room temperature; to provide a machine of the class described in which the tendency of the goods to stick to the various parts of the apparatus is eliminated; to provide apparatus of the class described which shall be capable of ready adaptation to existing bakery products and which shall be applicable to a wide variety of bakery goods; to provide a machine which shall be extremely handy, rapid, and efficient in operation; to provide a construction of apparatus which shall be simple and economical in design and manufacture; and, in general, to provide an improved machine of the character referred to.

In the drawings, which illustrate one embodiment of my invention—

Figure 1 is an end view of a machine for inserting bakery goods, such as fig bars or the like, into paper cartons;

Fig. 2 is a section taken on the line 2—2 of Fig. 1;

Fig. 3 is a section taken on the line 3—3 of Fig. 2;

Fig. 4 is a section taken on the line 4—4 of Fig. 2;

Fig. 5 is a perspective view of the ram-actuating devices;

Fig. 6 is a section taken on the line 6—6 of Fig. 1;

Fig. 7 is a section taken on the line 7—7 of Fig. 6;

Figure 8:
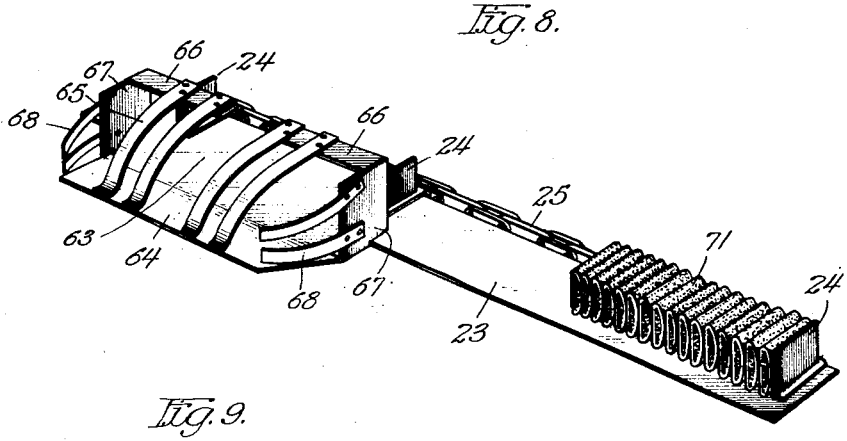
Fig. 8 is a perspective view of the filling chute and associated parts.

Referring to the drawings, it will be observed that the working parts are supported by two rows of spaced apart legs 20 connected transversely by suitable cross members 21 and longitudinally by means of angle irons 22. Preferably, the machine is made two-sided so as to obtain double the output without duplicating certain important mechanical parts. The bakery goods (in this instance fig bars) are removed from the ovens onto the packing trays, from which they are removed by hand (or by machinery) and placed in alined rows on the horizontal stationary slide plates 23 along which they are moved intermittently by fingers or pushers 24 spaced apart along and carried by the chains 25. The chains 25 are intermittently driven by mechanism as follows:

Stationarily mounted upon the tops of certain of the standards 20 is a large skeleton structure 26, across the top of which extend suitable beams or cross bars 27 upon which there is mounted the main drive motor 28. On the shaft of the said motor there is keyed a spur pinion 29 which meshes with and drives a large spur gear 30 keyed to a longitudinally extending drive shaft 31 rotatably mounted in bearings 32 and 33 bolted to opposite sides of the supporting structure 26. To the said shaft 31 there is also keyed a small spur pinion 34 which drives a large spur gear 35 keyed to a jack shaft 36 also journaled in stationary bearings 37 and 38 bolted to opposite sides of the supporting structure 26. One end of the shaft 36 extends through and beyond the bearing 37, and secured thereto is a bevel gear 39 which meshes with a smaller bevel gear 40 keyed to a cross shaft 41. Said cross shaft 41 is supported in the middle by a bracket bearing 42 bolted to the side of the supporting structure 26, its other end extending toward the side of the machine where it is journaled in a stationary pedestal bearing 43.

The outer end of the cross shaft 41 is extended through the bearing 43, and to the end of said shaft 41 there is keyed a crank arm 44. The outer end of said crank arm 44 is slotted, as shown at 45, to accommodate an adjustable slide (not shown) upon which is mounted a crank pin 46. The said crank pin 46 forms a journal bearing for the inner end 47 of a connecting rod 48, the outer end 49 of which is journaled upon a pin 50 secured in the side of an oscillatory pawl-actuating arm 51. The pawl-actuating arm 51 is rotatably mounted upon a cross shaft 52 extending transversely across the machine from one side to the other, and itself mounted to rotate in suitable stationary pedestal bearings. To the opposite ends of the said shaft 52 there are keyed a pair of sprockets 53 around which there are trained the chains 25 previously referred to. In order to facilitate the mounting of the shaft 52 in a convenient position above the level of the chains 25, there may be provided a pair of idler sprockets 54 revolving freely at opposite ends of a small cross shaft 55. The shaft 52 is intermittently driven through the agency of a ratchet wheel 56 keyed to said shaft, with which coöperates a pawl 57 journaled upon the rear end of the connecting pin 50, which has previously been referred to as being carried by the pawl-actuating arm 51. The oscillatory arm 51 is suitably journaled upon the shaft 52 so that it may rotate thereon in one direction without causing a rearward rotary movement of said shaft. The pawl 57 is held to its work in engagement with the teeth 59 of the ratchet wheel 56 by means of a small coil spring 60, one end of which is connected to a pin 61 in the side of the arm 50, the other end being hooked over a small pin 62 carried by the rear end of the pawl 57.

In view of the above description, it will be readily understood that the rows of biscuits or other bakery goods are intermittently advanced along the slideways on opposite sides of the machine until they reach the mouths of the filling chutes (see Fig. 8). Each of the said filling chutes comprises a bottom plate 63, the outer end of which is upwardly tilted, as shown at 64, so as to constitute the bottom of a wedge-shaped funnel, the upper side of which is skeletonized and comprises the downwardly-bent plate springs 65. The upper ends of said plate springs 65 are rigidly secured to a pair of cross pieces 66 projecting inwardly from the tops of a pair of side plates 67, which constitute the vertical walls of the guide chute. The side ends of the wedge-shaped filling chute are composed of a pair of curved resilient plate springs 68, the rear ends of which are riveted to the outsides of the end walls 67.

Figure 9:
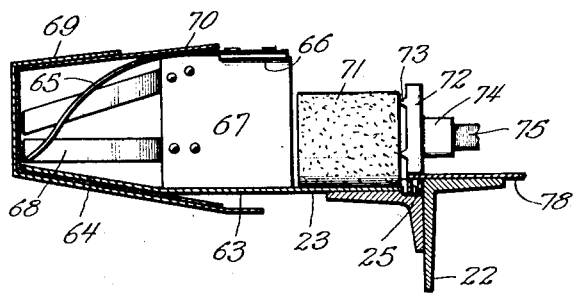
Fig. 9 is a section of the filling chute and associated parts, showing a charge of bakery goods prior to being inserted in the carton.
Figure 10:
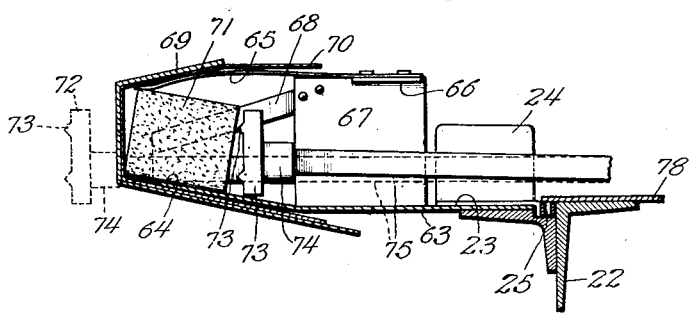
Fig. 10 is a view similar to Fig. 9, but showing the goods after having been forced into the carton.

The springs 65 and 68 are of such shape that the wedge-shaped end of the guide chute formed thereby will readily enter the open side of a carton 69 which may be placed thereon in the position shown in Fig. 9. Not only does the end of the guide chute enter the carton itself, but it also enters the mouth of the wax paper liner 70 with which such cartons are ordinarily equipped. Hence, it will readily be understood that a section or pack 71 of biscuits, or other bakery goods, when brought into register with the rear end of the guide chute, may then be thrust outwardly and into the carton by means of a reciprocatory ram 72, for instance as shown in Figs. 9 and 10. Preferably, as shown in dotted lines in Fig. 10, the movement of the ram 72 may be continued until the filled carton is pushed off the end of the wedge-shaped guide chute, thereby relieving the operator of the trouble of removing the same.

The ram-actuating mechanism will now be described. The ram-head 72, which extends horizontally the full length of a pack of biscuits, is preferably formed with a pair of horizontal outwardly projecting ribs 73, the function of which is to prevent the sticky bakery goods from adhering to the outer face of the ram. Also, if desired, the ram may be perforated as shown at $73^a$ in Fig. 5, so as to provide for a circulation of air for cooling purposes. At the rear of the ram 72 is an integral boss 74 in which is rigidly secured the outer end of a square stem 75. The rear end of said stem 75 is made L-shaped with a vertical limb 76, said vertical limb 76 carrying a horizontal pin on which is rotatably mounted a roller 77. Each of the said rollers 77 carried by the ends of both rams reciprocates along a horizontal track formed by the horizontal cross plate 78 and the strap member 79 bolted to the under side of the part 78 and spaced apart therefrom a sufficient distance to receive the said roller 77 (see Fig. 3). Each of the rams 75 also carries substantially midway of its length a second pin 80 on which is rotatably journaled a cam roll 81 which is arranged to run in a closed track, as shown best in Figs. 3, 5, and 7.

When the ram is in its innermost position, the cam roll 81 is in the position shown at 82 in Fig. 7, and during the out-stroke of the ram the said roll rolls along the bottom of the stationary horizontal plate 83. As the ram reaches its outermost position, the cam roll 81 passes under the end of the inclined track section 84, the upper end of which is hinged to a horizontal pivot 85. At the completion of such outward movement, the cam roll 81 of course raises the track section 84 into the dotted line position shown at 86, which track section drops back into its full line position 84 as soon as the ram reaches its outermost position. On the return stroke of the ram, the cam roll 81 obviously rides up on the top side of the inclined track section 84, and therefore, by reason of the rear end of the stem traveling in a horizontal line, the front end of the ram is raised into the dotted line position 87 (see Fig. 3). The adjacent ends of the members 66 (see Fig. 8) are spaced apart a sufficient distance to permit such upward movement of the ram while the latter is being retracted. As the ram completes its back stroke, the cam roll 81 of course travels along the cam groove 88 and finally drops down its curved end 8 into its original position, as shown in dotted lines at 82.

In order to prevent duplication of parts, the ends of the ram stems 75 and 75' are preferably linked together so that when one of the rams is moved, the other will make a similar movement. To this end, I mount at one side of the machine on a vertical pivot 90 a grooved pulley 91 around which is trained a suitable chain 92 connected to the vertical limbs 76 and 76' of the ram stems (see Fig. 5). With this construction, it will be manifest that when movement is imparted to the ram stem 75, the ram stem 75' will execute a similar movement, although of course in reverse direction. The idler pulley 93 is used to bring the ends of the chain into substantially parallel relation.

The ram 75 is moved outwardly by means of a crank pin 94 secured in one side of the spur gear 35. Said crank pin 94 is equipped with a roller 95 which, during the revolution of the spur gear 35, engages the upwardly projecting end of a vertical bar 96 bolted to the horizontal arm 97 of the slide 98. The slide 98 is arranged to reciprocate in a pair of upper and lower guides 99 and 100 bolted to one side of the supporting structure 26. The lower end of the vertical member 96 extends downwardly a sufficient distance to engage a small plate 101 bolted to the rear end of the ram stem 75, so that when the slide 98 is moved by the crank pin 94, the ram stem 75 will be moved outwardly, the other ram stem 75' being also moved outwardly by reason of the movement of the first ram stem 75.

The above arrangement of parts results in a regular and controlled movement of the rams while they are being thrust outwardly to insert the bakery goods into the cartons. However, I have found that it is quite important and desirable that the return movement of the rams should be quick and snappy in order to prevent the goods from sticking to the outer faces of the rams. Accordingly, I prefer to pull the rams rearwardly by means of a heavy coil spring 102, one end of which is secured to a stationary bracket 103 and the other end being connected to the rear end of the ram 75' by a cable 104 trained around a stationary idler pulley 105.

By inspection of Fig. 5, it will be manifest that any rearward movement imparted to the ram stem 75' will be correspondingly imparted to the ram stem 75 by reason of the chain 92 which connects together the rear ends of the said ram stems 75 and 75'. The spring 102 becomes effective to snap back the rams as soon as the crank pin roller 95 loses its engagement with the beam 96 and slips off the top end of the latter as the spur gear 35 continues its rotary movement.

The described details of construction are of course merely illustrative of a single particular application of my invention, the scope of which should be determined by reference to the appended claims.

I claim—

1. In a machine for inserting cakes or analogous bakery products into cartons, the combination of means for effecting intermittent, horizontal, straight-line movements of a series of packs of cakes, a substantially horizontal transverse guideway extending outwardly from the line of movement of said cakes, means for internally supporting an open-mouthed container at the outer end of said guideway in a position to receive a charge, and a pusher operating across the line of longitudinal movement of said cakes for moving the same along said guideway and into said container.

2. In apparatus of the class described, the combination of means for effecting horizontal straight line movement of a series of container charges each comprising a plurality of articles, and means for bodily moving individual charges transversely into and ejecting suitable containers.

3. In apparatus of the class described, the combination of a slideway, a series of pushers, means for moving said pushers parallel with said slideway to effect movement thereon of a series of container charges each comprising a plurality of articles, a transverse guideway, means for holding a package with the open mouth thereof in front of said guideway, and a transversely movable pusher member for moving charges successively, one by one, along said guideway into the package through the open mouth thereof as they come in register therewith.

4. In apparatus of the class described, the combination of a slideway, a series of pushers, means for intermittently moving said pushers step by step parallel with said slideway to effect movement thereon of a series of container charges each comprising a plurality of articles, a transverse guideway, a carton having the mouth thereof registering with said guideway, and a transversely movable pusher member for moving charges successively one by one along said guideway as they come in register therewith and pressing the charge through the mouth of the carton against the bottom thereof.

5. In apparatus of the class described, the combination of a slideway, a series of pushers, means for intermittently moving said pushers step by step parallel with said slideway to effect movement thereon of a series of container charges each comprising a plurality of articles, a transverse guideway, a transversely movable pusher member for moving charges successively one by one along said guideway as they come in register therewith, means at the end of the guideway adapted to be embraced by a charge receiving carton, and means for reciprocating said pusher member.

6. In apparatus of the class described, the combination of a slideway, a series of pushers, means for intermittently moving said pushers step by step parallel with said slideway to effect movement thereon of series of articles, a transverse guideway forming a lateral continuation of the slideway, a transversely movable pusher member for moving a predetermined number of said articles simultaneously along said guideway as they come in register therewith, means for effecting a controlled outward movement of said pusher member, and means for elevating and effecting a quick return thereof.

7. In apparatus of the class described, the combination of a ram, means for effecting a controlled outward movement of said ram to charge a container with a plurality of bakery goods, and means for effecting a quick combined lateral displacement and retraction of said ram.

8. In a carton filling apparatus, the combination of a guideway for supporting a charge of articles to be inserted in a carton, means for removably positioning a carton so that the mouth thereof opens onto the guideway, a reciprocal ram adapted to slide the charge along the guideway through the mouth of and into the carton, and means for deflecting the ram away from the guideway during its return movement to permit a new charge to be simultaneously fed onto the guideway.

9. In a carton filling apparatus, the combination of a guideway for supporting a charge of articles to be inserted in a carton, means for removably positioning a carton so that the mouth thereof opens onto the guideway, a reciprocal ram adapted to slide the charge along the guideway through the mouth of and into the carton, and means for elevating the ram above the guideway during its return movement so as to permit a new container charge to be simultaneously fed onto the guideway.

10. In a machine of the class described, the combination of a ram, means for moving said ram in a direction to move a plurality of baked articles into a container, and automatic means for transversely deflecting and snapping back said ram into retracted position subsequent to its charging stroke.

11. In a machine of the class described, the combination of a pair of rams, means for automatically and intermittently feeding charges of material in front of the rams, means for moving one of said rams to charge a container, and means mechanically linking said rams together whereby movement directly imparted to said first ram will effect a like movement of the second ram but in reverse direction.

12. In a machine of the class described, the combination of a pair of rams, means for automatically and intermittently feeding charges of material in front of the rams, means for moving one of said rams to charge a container, means mechanically linking said rams together whereby movement directly imparted to said first ram will effect a like movement of the second ram but in reverse direction, and means operating upon said second ram for retracting both of said rams.

13. In a machine of the class described, the combination of a pair of rams, means for moving one of said rams to charge a container, means mechanically linking said rams together whereby movement of said first ram will effect a like movement of the second ram but in reverse direction, and a spring operating upon said second ram for retracting both of said rams.

14. In a machine of the class described, the combination of a ram, a guideway in which the ram reciprocates, having means at the end for positioning a carton so that the mouth thereof faces the front of the ram, said guideway being adapted to support the material to be fed into the carton, a stem projecting rearwardly from the ram, means for effecting a straight line reciprocatory movement of the rear end of said stem, and means for effecting a circuitous movement of an intermediate point on said stem to cause an augmented similar circuitous movement of the ram.

15. In apparatus of the class described, the combination of a ram, a guideway in which the ram reciprocates, having means for removably positioning a carton with the open mouth thereof facing the front of the ram, said guideway being adapted to support a charge of material to be inserted in the carton, means for reciprocating the rear end of said stem in a substantially straight line, a stationary cam track having two paths connected together at their ends but converging intermediate their ends, and a cam roll connected to said stem at a point spaced apart from its rear end and coöperating with said cam track to cause the ram to move during its back-stroke in a path different from that of the out-stroke.

16. In apparatus of the class described, the combination of a ram, a guideway in which the ram reciprocates, having means for removably positioning a carton with the open mouth thereof facing the front of the ram, said guideway being adapted to support a charge of material to be inserted in the carton, means for reciprocating the rear end of said stem in a substantially straight line, a stationary cam track having two paths connected together at their ends but divergent intermediate their ends, and a cam roll connected to said stem at a point spaced apart from its rear end and coöperating with said cam track to cause the ram to move during its back-stroke in a path different from that of the out-stroke, said cam track being provided with a pivoted track section for controlling the movement of said roll.

17. In a carton filling apparatus, the combination of a chute having means at the end adapted to be embraced by a carton, said chute being adapted to receive a charge of material to be inserted in the carton, and a member adapted to reciprocate in the chute for inserting the charge of material therein in a carton and also ejecting the carton and its contents from the aforesaid means embraced by the carton.

18. In a carton filling apparatus, the combination of a support for material to be inserted in the carton, said support having a carton holder at the point of discharge, and means for ejecting the material from the support into the carton and also ejecting the carton and its contents from the holder.

19. In a carton filling apparatus, the combination of a support for material to be placed in the carton, said support being provided with means for holding a carton so that the mouth thereof opens toward the support, means for intermittently feeding a charge of material onto the support, and a reciprocatory member adapted to force the charge of material from the support in the carton and also eject the carton and its contents from the holder.

20. In a carton filling apparatus, the combination of a support for material to be placed in a carton, said support having means for removably supporting a carton in position to receive the material from the support, and a plunger for forcing the material into the carton, said plunger comprising an apertured head with ribs, for engaging and forcing the material into the carton.

21. In a carton filling apparatus, the combination of a frame having means at the side thereof for holding a carton, a plunger for filling a carton on said holder, and means at the side of the frame for receiving and conveying charges of material intermittently into position to be forced by the plunger into the carton.

JOHN G. PHILLIPS.